United States Patent
Yates

[19]

[11] Patent Number: 5,932,046
[45] Date of Patent: Aug. 3, 1999

[54] CUSHION MANUFACTURING METHOD

[76] Inventor: Paul M. Yates, 5814 Briar Tree Dr., LaCanada, Calif. 91011

[21] Appl. No.: 08/856,744

[22] Filed: May 15, 1997

Related U.S. Application Data

[63] Continuation-in-part of application No. 08/652,692, May 30, 1996, Pat. No. 5,679,193.

[51] Int. Cl.$^6$ .................................................. B32B 31/12
[52] U.S. Cl. ........................... 156/145; 156/77; 156/79; 156/285; 264/46.8
[58] Field of Search ............................... 156/77, 78, 79, 156/285, 145; 264/46.8

[56] References Cited

U.S. PATENT DOCUMENTS

| | | | |
|---|---|---|---|
| 4,114,213 | 9/1978 | Beernaerts | 156/285 |
| 4,116,736 | 9/1978 | Sanson | 156/285 |
| 4,913,755 | 4/1990 | Grim | 156/145 |
| 5,088,747 | 2/1992 | Morrison | 297/219 |
| 5,096,760 | 3/1992 | Thary | 428/71 |
| 5,340,352 | 8/1994 | Nakanishi | 2/267 |
| 5,362,834 | 11/1994 | Schapel | 528/58 |
| 5,679,193 | 10/1997 | Yates | 156/285 |
| 5,756,184 | 5/1998 | Yates | 428/188 |

Primary Examiner—Daniel Stemmer
Attorney, Agent, or Firm—Walter A. Hackler

[57] ABSTRACT

A method for manufacturing a fabric covered cushion includes the steps of coating one side of a stretchable fabric with gel/foam in order to make said fabric resistant to passage of air therethrough, disposing the coated fabric over a mold adapted for vacuum forming the cooled fabric and positioning at least one strap member in the mold with a portion of the strap member extending beyond a boundary of the mold. Thereafter, a vacuum is applied between the mold and the fabric in order to stretch the fabric and cause intimate contact between the fabric and the mold. An additional volume of foam is deposited on the fabric coating while the vacuum is being applied in order to enable bonding between the additional volume of gel/foam, the coated fabric and strap member. The additional gel/foam is allowed to set and bond with the fabric and the strap member, and a fabric covered cushion is removed from the mold having the selected contour.

17 Claims, 1 Drawing Sheet

CUSHION MANUFACTURING METHOD

The present application is a continuation-in-part of U.S. Ser. No. 08/652,692, filed May 30, 1996, now U.S. Pat. No. 5,679,193.

The present invention generally relates to a method of making gel cushions, and more particularly relates to a method of manufacturing a cushion having a molded gel and/or foam interior and a snugly fitted fabric covering. Fabric covered cushions include chair seat cushions, bicycle saddles, pillows, orthopedic wrist supports, and bumper guards, for example.

It is oftentimes desirable that a cushion be made to have a snugly fitted fabric jacket, for example, when it is important that the fabric covering resist slippage when the cushion is in use. One example of this is when a cushion is to be used as a seat pad, where a poor fitted fabric covering which shifts and bunches can lead to discomfort to the user.

Manufacturing a fabric covered cushion conventionally involves several steps and the use of multiple tools. Generally, one or more pieces of fabric are cut and sewn and the sewn fabric is filled with a soft, yielding cushion interior. In instances where the fabric covering must fit the cushion interior closely, elastic sewn to the fabric is sometimes used to maintain the stretch of the fabric over the cushion interior.

For example, a conventional method for manufacturing fabric covered cushions such as bicycle saddles, involves first creating a molded cushion interior and then fastening a stretchable fabric around the molded cushion interior. In a manufacturing facility, a large number of molded cushion interiors are made by molding a suitable material into the desired shape. This may involve depositing a mixture of recycled scrap material and adhesive into a mold, compressing the mixture within the mold to retain resiliency, and in allowing the mixture to set. Precut fabric coverings must then be fastened to the completed molded interiors. This is done by first stretching the fabric over the molded interior and fastening the fabric thereto by means of sewing. Elastic sewn to the fabric may be used to retain the stretch of the fabric over the cushion. The fabric may be more securely fastened to the molded interior by use of adhesive. The process therefor involves several steps.

Cushioning devices having liquid or gel filled bladders have been developed in the attempt to provide a more comfortable, more durable support than is possible with solid or foam rubber supports. For example, U.S. Pat. No. 5,435,508 discloses a wrist rest support comprising a viscous, fluid-filled bladder removably inserted in a machine washable outer covering.

This prior art device, and others which are similar thereto, are manufactured by several independent steps, including sewing or other means of assembling the bladder, filling the bladder with the desired liquid, sealing the bladder such that it will resist leakage, and fashioning an outer covering in which to enclose the liquid filled bladder.

The present invention provides a substantially less complicated process for manufacturing a comfortable fabric covered cushion that includes all the advantages of a liquid support medium. Although the method of the present invention produces a fabric covered foam-cushion, no sewing, sealing or gluing is required in the process of making the cushion.

In cushions that have variable contour, several fabric pieces are needed in order to provide the necessary close fitted covering. The pieces are fastened together by sewing. In addition, any buckles, straps and other accessories are sometimes sewn to the cushion.

Unfortunately, sewn seams often come apart and unravel as the cushion begins to wear, and consequently, the once snug fitted fabric covering becomes loose and begins to slip and bunch, to the discomfort of the user. Stuffing may protrude through the broken seam in an unsightly manner.

Protruding stuffing may also present a potential choking hazard to small children. This is a particular concern with certain cushions used in devices such as child car seats and baby swings, in which sewn seams have been known to unravel, revealing polyester fiber filling therein. In these types of devices, it would be advantageous to make the cushion with as few seams as possible, while enabling manufacturing of the seat with any desired contour.

The present invention overcomes all of the disadvantages with the manufacturing of prior art cushions discussed hereinabove. In accordance with the present invention, molded cushions with variable contour may be easily made from a single piece of fabric without the need for sewing or adhesive. In addition, the present invention provides an inexpensive, simple manufacturing method for creating a fabric covered cushion having multiple cushion interiors.

SUMMARY OF THE INVENTION

In one embodiment of the present invention, a method for manufacturing a gel or foam-cushion having fabric upper surface and an adhesive lower surface, generally, comprises the steps of first coating one side of a porous, stretchable fabric with gel/foam in order to make the fabric resistant to the passage of air therethrough, and next, disposing the fabric over a mold adapted for vacuum forming the fabric. A vacuum is then applied between the coated fabric and the mold in order to cause intimate contact between an uncoated side of the fabric and the mold. Smooth, creaseless contact between the mold and the fabric is made possible by the stretching property of the fabric.

While the vacuum is being applied, an additional volume of foam is deposited on the coated side of the fabric in order to cause bonding between the additional volume of gel/foam and the fabric. Preferably, the additional volume is sufficient to substantially fill the mold. The gel/foam is allowed to solidify and finally, the solidified gel/foam, having the fabric fixed thereto, is removed from the mold in order to obtain the gel/foam cushion for use as a wrist rest or other cushion device having a fabric upper surface and a removably adhesive gel/foam lower surface.

In addition, the method may include the step of removing extraneous portions of solidified gel/foam along edges of the mold, in order to produce a smooth, attractive gel/foam cushion. This step may be accomplished by pressing a rigid mat flat against the mold such that the extraneous portion is pinched between the rigid mat and the edges of the mold and cut away from the balance of the solidified gel/foam. Upon contact with the mat, the solidified gel/foam will adhere thereto. Thus, the gel/foam cushion may be removed from the mold by lifting the rigid mat and subsequently peeling the gel/foam cushion from the mat.

Furthermore, the gel/foam cushion may be produced with air pockets, or voids, within the solidified gel/foam in order to enable the gel/foam cushion to adhere to surfaces disposed at sharp angles to each other. Such voids may also be produced in order to increase softness of the cushion. Particularly, air filled balloons, or hollow bags, made of a suitable flexible material may be placed in the mold prior to the depositing of the gel/foam in the mold. Upon the gel/foam solidifying, the gel/foam cushion will include air pockets formed by the balloons.

In accordance with another embodiment of the present invention, a method for manufacturing a fabric covered cushion includes the steps of disposing a stretchable fabric over a mold having a selected contour and positioning at least one strap member in the mold and onto the gel/foam material such that a portion of the strap member extends beyond a boundary of the mold, depositing a gel/foam on the stretchable fabric and strap member in the mold in a volume sufficient to substantially fill the mold and make said stretchable fabric resistant to passage of air therethrough. A vacuum is then applied between the mold and the fabric in order to stretch the fabric and cause intimate contact between the fabric and the mold. The gel/foam is allowed to set and bond with the fabric and the strap member and a fabric covered cushion having the selected contour is removed from the mold.

In yet another embodiment, the method may include the step of coating one side of the stretchable fabric with gel/foam in order to make the fabric resistant to passage of air therethrough before positioning the strap member and filling the mold with gel/foam.

In addition, the fabric may be coated with gel/foam before placing the fabric into the mold in order to prevent the gel/foam from penetrating the fabric during the vacuum step, if necessary, depending on the gel/foam used.

BRIEF DESCRIPTION OF THE DRAWINGS

The present invention may be more clearly understood with reference to the following detailed description, in conjunction with the appended drawings of which.

DETAILED DESCRIPTION

Figure 1:
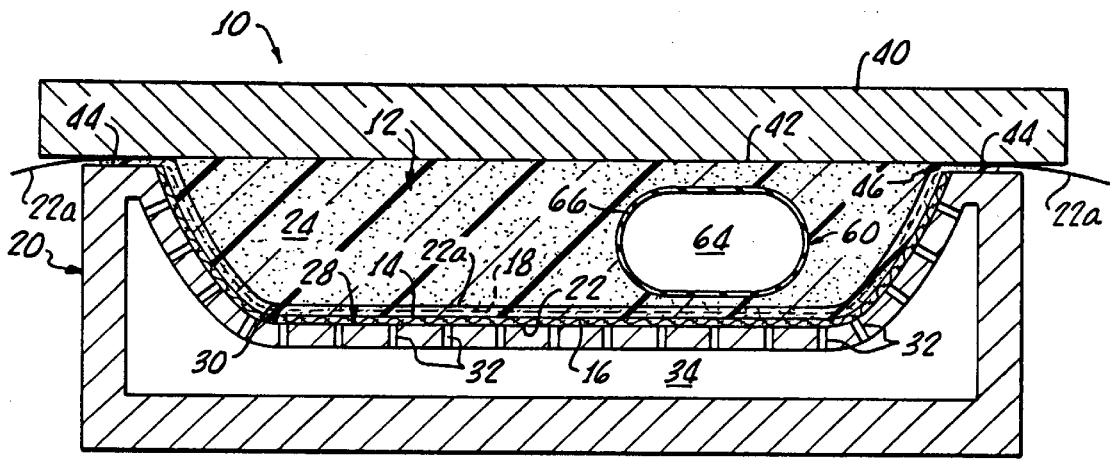
FIG. 1 shows apparatus suitable for practicing a method for manufacturing a gel/foam cushion having a fabric upper surface and an adhesive lower surface, in accordance with the present invention.

Turning now to FIG. 1, an apparatus 10 suitable for manufacturing a wrist support gel/foam cushion 12 in accordance with the method of the present invention is shown in cross section. The method generally comprises the steps of coating one side 14 of a stretchable fabric 16 with gel 18, foam, or foamable gel, foamable liquid or gelable liquid, for example, a urethane foam; disposing the fabric 16 over a mold 20; applying a vacuum between the fabric 16 and the mold 20 in order to cause intimate contact between an uncoated side 22 of the fabric 14 and the mold 20; positioning at least one strap 22 in the mold 20 onto the form 18, strap portions 22a extending beyond, or outside, of the mold 20; depositing an additional volume 24 of gel/foam over the coated side 14 of the fabric 16 during the application of the vacuum; allowing the additional volume 24 to solidify and adhere to the gel/foam coating 18 and strap 22 removing the solidified gel/foam 24 and adhered fabric 16 from the mold in order to obtain a gel/foam cushion 12 with strap portions 22a extending therefrom. It should be appreciated that the gel, or foam, coats 18 may be the same composition as the additional volume 24 of gel/foam, or different, as long as they are compatible for bonding with one another.

Particularly, the fabric 16 may be a porous, four-way stretch fabric, made of an elastomeric thread, preferably a segmented polyester-polyurethane, like that sold under the trade name "Lycra®", available from I.E. Dupont de Nemours and Company. It should be appreciated that many other types of porous, stretchable material, including porous films, may be used in the method of the present invention. The strap may be of any suitable material for use with buckles (not shown) or the like, for securing the gel/foam cushion 12 to another object (not shown).

The gel/foam coating 18 and the additional volume 24 both comprise any suitable, settable gel/foam. Alternatively, the strap 22 may be positioned on the fabric 16 before application of the gel/foam 18, 24, however, some adherence between the fabric 16 and the strap 22 is sacrificed.

After the step of coating the fabric 16, the fabric 16 is disposed over the mold 20, said mold 20 being adapted for vacuum forming the fabric 16. Importantly, the fabric 16 is disposed over the mold 20, such that the uncoated side 22 is placed in contact with the mold 20, or more specifically, a molding surface 28 having a selected contour 30. Thus, the foam coated side 16 will be exposed during this step. In other words, the foam coated side 16 will face away from the molding surface 28.

The mold 20 may be adapted for vacuum forming in any suitable, conventional manner. For example, the mold 20 may include vacuum ports 32 through the molding surface 28 and in communication with a hollowed cavity 34 to which a vacuum may be applied. The molding surface 28 is preferably elongated in shape, and the selected contour 30 thereof may be generally flat, curved or arcuate in form, depending upon the particular application of which the gel cushion 12 is to be used.

After placement of the fabric 16 over the mold 20, a vacuum is applied between the fabric 16 and the mold 20. Importantly, the gel/foam coating 18 renders the porous fabric 16 impermeable, or resistant, to the passage of air therethrough. Consequently, the fabric 16 is vacuum moldable even when fibers thereof (not shown) are substantially stretched apart.

In addition, the elasticity of the gel/foam may enable substantial stretching of the gel/foam coating 18 without deterioration or breakage thereof, which would cause the coated fabric 16 to become air permeable, and thus resistant to vacuum forming. In effect, the present invention enables the fabric 16 to be optimally stretched and vacuum molded, thus creating a smooth, creaseless fabric surface defined by the selected contour 30 of the mold 20.

The vacuum may be applied in any suitable fashion. For example, a vacuum device (not shown) may be applied to evacuate the cavity 34, and consequently create a vacuum between the coated fabric 16 and the molding surface 28. Thus, the fabric 16 becomes four-way stretched and forced into intimate contact with the molding surface 28.

During application of the vacuum, the additional volume of gel/foam 24 is deposited onto the fabric coating 18, by pouring or injecting said additional volume 24 into the mold 20. Upon contacting the gel/foam coating 18, the additional volume 24 will partially melt and bond therewith.

After the additional volume of gel/foam 24 is deposited on the fabric coating 18, the total volume of gel/foam 18, 24 is allowed to solidify or set. The solidified gel/foam 18, 24 provides means for supporting the fabric 16 in the selected contour 30. Actual setting time will depend upon the particular gel/foam composition being used.

The completed gel/foam cushion 12 is now ready for removal from the mold 20. The step of removing the solidified gel/foam 18, 24 and the coated fabric 16 fixed thereto may be performed by placing a rigid mat 40 flat against the mold 20 in order to cause contact between the rigid mat 40 and an exposed surface 42 of the solidified gel/foam 24. The tackiness of the solidified gel/foam 24 will cause it to adhere to the rigid mat 40, and thus upon lifting the mat 40 from the mold 20, the gel/foam cushion 12 is lifted as well. If the solidified gel/foam is not tacky, any suitable adhesive may be used.

Next, the gel/foam cushion 12 may be manually or otherwise peeled from the mat 40 and subsequently used, for example, as a back support. The final gel/foam cushion 12 will have a soft fabric upper surface 22, vacuum formed in the selected contour 30, and straps 22 for enabling removable fastening of the gel/foam cushion 12 to a selected surface, or object, such as for example, a chair (not shown).

Notably, the present invention may include the step of removing any extraneous portions 44 of solidified gel/foam 18, 24, for example, by cutting the extraneous portion 44 from the balance of the gel/foam cushion 12. Preferably, in the depositing step, the additional volume 24 is sufficient to substantially or completely fill the mold 20 to capacity. This aids in easy removal from the mold 20 and the making of an attractive, uniform gel cushion 12. Thus, it is likely that in an attempt to fill the mold with the additional volume 24 of gel/foam, the mold may be overfilled, thus creating the extraneous portions 44, such as runners of excess gel/foam along mold edges 46. Any extraneous portion 44 may be cut from the balance of the gel/foam cushion 12 while still in the mold 20, care being taken, of course, not to cut the strap portions 22a.

Preferably, the step of cutting is included in the step of pressing the rigid mat 40 flat against the filled mold. Particularly, the rigid mat 40 may be pressed with sufficient force such that the extraneous portion 44 of solidified gel/foam is pinched between said mold edge 46 and the rigid mat 40, and severed from the balance of the gel/foam 18, 24.

Another feature of the present invention is the optional step of positioning on the coated fabric 16 within the mold 20, one or more hollow balloons, or bags 60, made of a flexible material in order to form one or more air pockets, or voids 64, in the completed gel/foam cushion 12.

More particularly, the hollow bag 60 is positioned in a desired fashion upon the coated fabric 16 during the vacuuming step. While the hollow bag 60 is so positioned, the additional gel/foam 24 is deposited on the coated fabric 16 such that the hollow bag 60 is substantially surrounded by gel/foam 24. The gel/foam 18, 24 is then allowed to solidify as described above.

The hollow bag 60 is preferably comprised of a material capable of bonding with the gel/foam 18, 24. More particularly, the hollow bag 60 may be made of a compatible material so that bonding to the gel/foam 24 occurs. Air trapped inside the hollow bag 60 may temporarily expand due to the heat and due to setting of the gel/foam 24, if any, poured around the bag 60, but the resilience and elasticity of the bag walls 66 enable substantial expansion without bursting thereof.

Alternatively, the voids 64 may be formed on the surface 42 by use of the bag 60 or by causing the void 64 to be congruent with the surface 42 by any suitable means (not shown).

Figure 2:
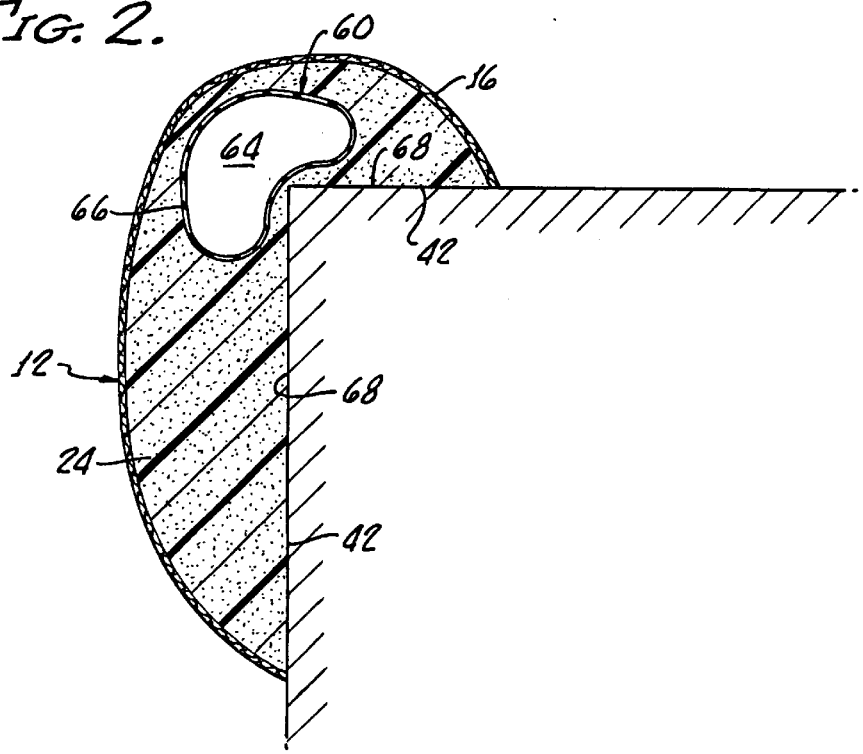
FIG. 2 shows a foam cushion having a void therein, in accordance with the present invention, in order to enable said foam cushion to adhere to surfaces disposed at angles to each other.

Turning now to FIG. 2, a gel/foam cushion 12 is shown including one such void 64 therein. As shown, the void 64 provides means for enabling the gel/foam cushion 12 to be bent, or flexed, sharply around angles surfaces 68, while maintaining an ability of the gel/foam cushion 12 to adhere thereto. For example, the gel/foam cushion 12 may be used as a seat for a chair, providing not only a cushion for a person's posterior, but also behind the knees to preset a seat edge (not shown) from causing irritation. Other uses may include use as a safety bumper, or guard, on a corner of table, desk, computer or the like. Without the void 64 therein, the gel/foam cushion may tend to spring apart from its position on an angled surface 68 due to the rubberness of the gel/foam 18, 24.

The voids 64 formed in the gel/foam cushion 12, by the hereinabove described method, also tend to enhance softness of the gel/foam cushion 12 and thus may increase comfort of some persons using the cushion 12.

Although there has been hereinabove described a gel/foam cushion and a method of manufacturing same, in accordance with the present invention, for the purpose of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the appended claims.

What is claimed is:

1. A method for manufacturing a fabric covered cushion comprising the steps of:
   coating one side of a stretchable fabric with a material in order to make said fabric resistant to passage of air therethrough, said material being selected from the group consisting of gel and foam;
   disposing the coated fabric over a mold adapted for vacuum forming the coated fabric;
   positioning at least one strap member in the mold with a portion of the strap member extending beyond a boundary of the mold;
   applying a vacuum between the mold and the fabric in order to stretch the fabric and cause intimate contact between the fabric and the mold;
   depositing an additional volume of said material on the fabric coating while the vacuum is being applied in order to enable bonding between the additional volume of said material, the coated fabric and strap member;
   allowing the additional material to set and bond with the fabric and the strap member; and
   removing a fabric covered cushion having the selected contour from the mold.

2. The method according to claim 1 further comprising the steps of disposing a second fabric onto the material deposited in the mold in order to enclose the material within the fabric pieces and bonding the stretchable fabric and the second fabric along the mold boundary.

3. The method according to claim 2 wherein the stretchable fabric and the second piece of fabric are made of the same material.

4. The method according to claim 1 wherein the material material is polyurethane foam.

5. The method according to claim 1 further including the step of positioning, within the mold, a hollow bag made of a flexible material capable of bonding with the material in order to form a void in the cushion, the step of positioning the hollow bag performed after the step of disposing the coated fabric and before the step of depositing an additional volume of the material.

6. A method for manufacturing a fabric covered cushion comprising the steps of:
   disposing a stretchable fabric over a mold having a selected contour and adapted for vacuum forming the fabric;

depositing a material on the stretchable fabric in the mold in a volume sufficient to substantially fill the mold and make said fabric resistant to passages of air therethrough;

applying a vacuum between the mold and the fabric in order to stretch the fabric and cause intimate contact between the fabric and the mold;

positioning at least one strap member in the mold and onto material material such that a portion of the strap member extends beyond a boundary of the mold and another portion of the strap is in contact with the material in order to cause bonding between the another portion of the strap and the material;

allowing the material to set and bond with the fabric and the strap member;

removing a fabric covered cushion having the selected contour from the mold.

7. The method according to claim 6 further comprising the steps of disposing a second fabric onto the material filled mold in order to enclose the material within the fabric pieces allowing and bonding between the stretchable fabric and the second fabric by means of the material material along the mold boundary.

8. The method according to claim 7 wherein the stretchable fabric and the second piece of fabric are made of the same material.

9. The method according to claim 8 wherein the material material is polyurethane foam.

10. The method according to claim 6 further including the step of positioning, within the mold, a hollow bag made of a flexible material capable of bonding with the material in order to form a void in the cushion.

11. A method for manufacturing a fabric covered cushion comprising the steps of:

disposing a stretchable fabric over a mold having selected contours and adapted for vacuum forming the fabric;

coating a gelable liquid onto at least a portion of the stretchable fabric to make the fabric resistant to passage of air therethrough;

applying a vacuum between the mold and the fabric in order to cause intimate contact between the fabric and the mold;

depositing a foam material onto the fabric and the gelable liquid in a volume sufficient to substantially fill a remaining volume of the mold;

allowing the gelable liquid and the foam to cure and foam to bond with the fabric;

removing a fabric covered cushion having different resiliencies from the mold.

12. The method according to claim 11 further comprising the step of positioning at least one strap member in the mold and onto the gelable liquid with a portion of the strap member extending beyond a boundary of the mold.

13. The method according to claim 12 wherein the step of positioning a strap member includes positioning the strap member across the mold such that two ends of the strap member extend past the boundary of the mold in order to enable fastening together of the two ends after the cushion has been removed from the mold.

14. The method according to claim 11 further comprising the steps of disposing a second fabric onto the foam filled mold in order to enclose the foam material and gel within the fabric pieces and allowing bonding between the stretchable fabric and the second piece of fabric by means of the foam material along the mold boundary.

15. The method according to claim 14 wherein the stretchable fabric and the second fabric are made of the same material.

16. The method according to claim 11 wherein the foam material is polyurethane foam.

17. The method according to claim 11 further including the step of positioning, within the mold, a hollow bag made of a flexible material capable of bonding with the foam in order to form a void in the cushion, the step of positioning the hollow bag performed after the step of disposing the coated fabric and before the step of depositing the foam.

* * * * *